Patented Feb. 19, 1952

2,585,917

UNITED STATES PATENT OFFICE 2,585,917

PROCESS FOR THE MANUFACTURE OF QUATERNARY SALTS OF PYRIMIDYL-AMINOQUINOLINES

Francis Henry Swinden Curd, Blackley, Manchester, England, assignor to Imperial Chemical Industries Limited, a corporation of Great Britain No Drawing. Application August 13, 1948, Serial No. 44,236. In Great Britain August 22, 1947

5 Claims. (Cl. 260—256.4)

This invention relates to new quinoline derivatives and more particularly it relates to a process for the manufacture of new di-quaternary salts of pyrimidylamino quinolines which are useful chemotherapeutic substances. In particular they possess valuable trypanocidal properties.

The said new compounds may be represented by the formula Pq-NH-Qq in which Pq stands for a 2-, 4- (or 6-) amino-substituted pyrimidine nucleus which is attached to the linking -NH- group at another of the 2-, 4- (or 6-) positions and which may be further substituted in the remaining 2-, 4-, (or 6-) position by a lower alkyl radical or an amino group, Q stands for a quinoline nucleus which is substituted in the 2-, or 4-position by an amino group and which may be further substituted by a lower alkyl group or groups, and which bears the linking -NH- group in the 6-position and the symbols q indicate that the preceding nuclei, P and Q respectively, are present in the form of their quaternary salts.

I have found for instance that the substance 4-amino-6-(2'-amino-6'-methylpyrimidyl-4'-amino) -1-methylquinaldinium iodide methiodide or, as it may also be named, 4-amino-6(2'-amino-6'-methylpyrimidyl-4'-amino)-quinaldine 1:1'-dimethiodide and the corresponding methochloride and di(metho-methyl sulphate) have valuable trypanocidal properties inasmuch as, when administered subcutaneously at a dose of 1.25 mg. per kg. of mouse weight, into mice infected with Trypanosoma congolense there is obtained 100% recovery of the mice from the trypanosomiasis and there is no serious local or general, immediate or delayed, toxic effect. Also moreover 4-amino-6-(2'-amino-6'-methylpyrimidyl-4'-amino)quinaldine 1:1' - dimethochloride is active against Trypanosoma congolense in cattle, against T. evansi in camels, against T. simiae in pigs and against T. equiperdum, T. equinum and T. brucei in mice. Studied against T. congolense in cattle it has been found to possess, besides a curative effect in infected cattle, also a prophylactic effect in healthy cattle. Thus a dose of 1 mg. per kg. animal weight renders the animal resistant to T. congolense infection during a period of at least three months following inoculation.

It will be understood that although the new compounds in question are described herein as di-quaternary salts of pyrimidylaminoquinolines they can also be formulated and named as salts of mono-quaternary salts of dihydropyrimidylaminoquinolines or of pyrimidylaminodihydroquinolines or again as di-salts of dihydropyrimidylaminodihydroquinolines. More explicitly, the substance named above as 4-amino-6-(2'-amino-6' - methylpyrimidyl - 4'-amino) -1-methylquinaldinium iodide 1'-methiodide or as 4-amino-6-(2'-amino - 6'-methylpyrimidyl-4'-amino) quinaldine 1:1'-dimethiodide may also be named 4-amino - 6 - (2'-imino-1':6'-dimethyl-1':2'-dihydropyrimidyl-4'-amino) quinaldine 1-methiodide hydriodide, or 4-imino-1-methyl-6-(2'-amino-6'-methylpyrimidyl-4'-amino) -1:4 - dihydroquinaldine 1'-methiodide hydriodide, or again as 4-imino -1- methyl -6-(2'- imino -1':6'- dimethyl-1':2'-dihydropyrimidyl- 6' -amino) -1:4-dihydroquinaldine dihydriodide.

According to the invention there is provided a process for the manufacture of the said new substances of the formula Pq-NH-Qq wherein P, Q and q have the meaning hereinbefore stated which comprises reacting one or more of the substances P-NH-Q, Pq-NH-Q and P-NH-Qq with a quaternary salt-forming agent.

It will be understood that in reacting a substance of the formula P-NH-Q with a quaternary salt-forming agent the reaction may take place in a single stage or in two stages. That is to say one may obtain as an intermediate product one or both of the compounds Pq-NH-Q and P-NH-Qq, and it may be necessary to isolate the desired di-quaternary salt from a mixture of products.

As suitable quaternary salt-forming agents there are for example methyl iodide, dimethyl sulphate and methyl p-toluene sulphonate.

The reaction is carried out by heating the reactants together, conveniently in a solvent which may be for example ethyl alcohol, acetonitrile or nitrobenzene. Where the tendency for the formation of intermediate products is marked the process may advisedly be carried out in a solvent of high boiling point such as nitrobenzene, or, alternatively, if the solvent is of low boiling point, in a closed vessel under pressure. Where the quaternary salt-forming agent is a dialkyl sulphate it is convenient to use a dry non-hydroxylic solvent and dry nitrobenzene has been found to be particularly suitable for this purpose.

It is frequently convenient in isolation of the product to convert the quaternary salt to the salt of a different anion. Thus a dimethochloride may often conveniently be made by using as quaternary salt-forming agent dimethyl sulphate and then converting the resultant di(methomethyl sulphate) into the dimethochloride by the action of e. g. sodium chloride.

The invention is illustrated but not limited by the following examples in which the parts are by weight.

Example 1

28 parts of 4-amino-6-(2'-amino-6'-methyl-pyrimidyl-4'-amino)-quinaldine, 43 parts of methyl iodide and 250 parts of ethyl alcohol are heated together in a closed vessel at 100–110° C. for 16 hours. The mixture is then cooled and filtered and the solid residue is washed with ethyl alcohol and crystallised from a mixture of equal parts of ethyl alcohol and water. There is thus obtained a complex containing 4-amino-(2'-amino-6'-methylpyrimidyl-4'-amino)quinaldine-1:1'-dimethiodide and 4-amino-(2'-amino-6'-methylpyrimidyl-4'-amino)quinaldine-1-methiodide hydriodide, m. p. 300–301° C., from which the former is separated in the following manner:

10 parts are dissolved in 700 parts of hot water and 10 parts of hydrochloric acid are added and the dichloride is filtered off. 5 parts of this are dissolved in 150 parts of hot water and sodium carbonate is added to render the solution alkaline to Brilliant yellow. Sodium chloride is then added and the precipitated product is collected and washed with a little water. It is then extracted with 35 parts of hot water and the insoluble residue is collected and crystallised from a large volume of water to give 4-amino-6-(2'-amino-6'-methylpyrimidyl-4'-amino)quinaldine-1:1'-dimethochloride as colourless needles, m. p. 316° C. (decomp.).

The starting material 4-amino-6-(2'-amino-6'-methylpyrimidyl-4'-amino)quinaldine can be made by either of the following methods:

(a) 13.2 parts of 4:6-diaminoquinaldine, 10.8 parts of 4-chloro-2-amino-6-methylpyrimidine, 150 parts of water and 21.2 parts of concentrated hydrochloric acid are boiled together under reflux for 1 hour and the reaction mixture is then cooled and made just alkaline with ammonia. On the addition of a little salt the hydrochloride of 4-amino-6-(2'-amino-6'-methylpyrimidyl-4'-amino)quinaldine rapidly separates. It is collected and crystallised from 50% aqueous alcohol to give colourless fine needles, m. p. 345° C. (decomp.). This hydrochloride is converted to the base by treatment, in aqueous solution, with sodium hydroxide. The base crystallises from 60% aqueous alcohol as colourless hair fine needles, m. p. 299–300° C.

(b) 6.45 parts of 6-amino-4-hydroxyquinaldine hydrochloride (Kermack & Weatherhead, J. Chem. Soc., 1939, 563), 4.6 parts of 4-chloro-2-amino-6-methylpyrimidine (Gabriel and Colman, Ber., 1899, 32, 2924) and 20 parts of water are boiled together under reflux for 6 hours. The resulting solution is cooled and made alkaline with ammonia to precipitate 4-hydroxy-6-(2'-amino-6'-methylpyrimidyl-4'-amino)quinaldine which is collected, washed with water and dried. It can be crystallised from aqueous 2-ethoxyethanol and then forms very pale yellow needles, m. p. 356–357° C. (decomp.).

10 parts of 4-hydroxy-6-(2'-amino-6'-methylpyrimidyl-4'-amino)quinaldine and 20 parts of phosphorus oxychloride are mixed. When the resulting vigorous reaction subsides, the mixture is refluxed for 20 minutes, then cooled and poured into 250 parts of 5% sodium hydroxide solution. The precipitated product is collected, washed alkali-free with water and crystallised from dry methyl alcohol to give 4-chloro-6-(2'-amino-6'-methylpyrimidyl-4'-amino)quinaldine as practically colourless needles, m. p. 254° C.

4.3 parts of 4-chloro-6-(2'-amino-6'-methylpyrimidyl-4'-amino)quinaldine is dissolved in 8 parts of phenol, the solution is heated to 100° C. and ammonia is passed in. The temperature is raised to and maintained at 180° C. for 3 hours. The reaction mixture is then cooled and poured into dilute sodium hydroxide solution. The precipitated 4-amino-6-(2'-amino-6'-methylpyrimidyl-4'-amino)quinaldine is collected, washed free from alkali with water and crystallised from 50% aqueous alcohol. It then has m. p. 299–300° C.

Example 2

5.4 parts of 4-amino-6-(4'-amino-6'-methylpyrimidyl-2'-amino)quinaldine, 9 parts of methyl iodide and 25 parts of methyl alcohol are heated together in a closed vessel at 115–120° C. for 6 hours. After cooling, the product is filtered off and crystallised from 50% alcohol. It is then extracted with 13.5 parts of hot water and the insoluble residue is extracted with 20 parts and then with 30 parts of hot water. The combined aqueous extracts are cooled and the crystalline material which separates is collected and recrystallised from 50% aqueous alcohol to give 4-amino-6-(4'-amino-6'-methylpyrimidyl-2'-amino)quinaldine 1:1'-dimethiodide as colourless prisms, m. p. 296–298° C.

The starting material, 4-amino-6-(4'-amino-6'-methylpyrimidyl-2'-amino) quinaldine is made in the following way:

4.2 parts of 4:6-diaminoquinaldine, 3.4 parts of 2-chloro-4-amino-6-methylpyrimidine (Gabriel and Colman, Ber., 1899, 32, 2924), 50 parts of water and 7 parts of hydrochloric acid are boiled together under reflux for 4 hours. After cooling, the colourless crystalline material which separates is filtered off, dissolved in water and the solution is made alkaline with sodium hydroxide to precipitate 4-amino-6-(4'-amino-6'-methylpyrimidyl-2'-amino)quinaldine which crystallises from alcohol as very pale yellow prisms, m. p. 272–273° C.

Example 3

5.3 parts of 4-amino-6-(2'-aminopyrimidyl-4'-amino)-quinaldine, 75 parts of acetonitrile and 9 parts of methyl iodide are mixed and the mixture is boiled under reflux for 18 hours. After cooling, the solid is collected and crystallised from 200 parts of water to give 4-amino-6-(2'-aminopyrimidyl-4'-amino)quinaldine 1:1'-dimethiodide, m. p. 302° C. (decomp.).

The starting material is made in the following way:

17.3 parts of 4:6-diaminoquinaldine and 12.9 parts of 4-chloro-2-aminopyrimidine are dissolved in 200 parts of N/10 hydrochloric acid and the solution is boiled under reflux for 1 hour. The cooled reaction mixture is made alkaline to Clayton yellow by the addition of 35% sodium hydroxide solution, the precipitated solid is collected, washed alkali-free with water and crystallised from a mixture of 150 parts of alcohol and 100 parts of water to give 4-amino-6-(2'-amino-pyrimidyl-4'-amino)quinaldine as colourless needles which decompose at 268° C.

Example 4

4.1 parts of dry 4-amino-6-(2'-amino-6'-methylpyrimidyl-4'-amino)quinaldine 1'-methiodide are suspended in 50 parts of dry nitrobenzene, the temperature of the mixture is adjusted to 100° C. and 2 parts of dimethyl sulphate are added. The mixture is then stirred at 105° C. for 21 hours. After cooling, 150 parts of acetone are added and the solid is collected, washed free from nitrobenzene with acetone and dried. It is then dissolved in 70 parts of water and excess brine is added to precipitate 4-amino-6-(2'-amino-6' - methylpyrimidyl - 4' - amino)-quinaldine 1:1'-dimethochloride which crystallises from water as colourless needles, m. p. 316° C. (decomp.).

The starting material 4-amino-6-(2'-amino-6' - methylpyrimidyl - 4' - amino)quinaldine 1'-methiodide is made in the following manner:

13 parts of 4:6-diaminoquinaldine are dissolved in a mixture of 112.5 parts of 2N-hydrochloric acid and 37.5 parts of water, a boiling solution of 21.5 parts of 4-chloro-2-amino-6-methylpyrimidine 1-methiodide in 150 parts of water is added and the mixture is boiled under reflux for 1 hour. After cooling, the yellow granular solid is collected, dissolved in 100 parts of water and precipitated by the addition of excess potassium iodide. The precipitated solid is filtered off and crystallised from 100 parts of water. It consists of 4-amino-6-(2'-amino-6'-methylpyrimidyl-4'-amino)quinaldine 1'-methiodide hydriodide which forms pale pink prisms, m. p. 292–293° C. (decomp.).

5.6 parts of this material are dissolved in a mixture of 100 parts of water and 100 parts of ethyl alcohol, warmed to 30° C. and 11 parts of 4% sodium hydroxide solution are added. The pale buff plates which rapidly separate are collected, washed with water and crystallised from 50% aqueous β-ethoxyethanol to give 4-amino-6-(2'-amino - 6' - methylpyrimidyl - 4' - amino)-quinaldine 1'-methiodide of m. p. 332° C. (decomp.).

*Example 5*

To 11.2 parts of dry 4-amino-6-(2'-amino-6'-methylpyrimidyl-4'-amino)quinaldine and 142 parts of dry nitrobenzene at 100° C., 10.6 parts of dimethyl sulphate are added. The temperature rises to 110° C. and when it begins to fall it is raised to 120–122° C. and so kept for 3 hours. The reaction mixture is then cooled and the product is filtered off and washed with 4 parts of cold methyl alcohol. It is then stirred with 80 parts of cold methyl alcohol, for 30 minutes, filtered off and washed with 20 parts of methyl alcohol. It is then boiled with 80 parts of methyl alcohol, filtered hot and washed with 20 parts of hot methyl alcohol. 4-amino-6-(2'-amino-6'-methylpyrimidyl-4'-amino) quinaldine 1:1'-dimethomethylsulphate is thus obtained as a creamy white crystalline solid, m. p. 259–260° C.

When an aqueous solution of this dimethomethlysulphate is treated with sodium chloride the 1:1'-dimethochloride is precipitated. This crystallises from water and has m. p. 316–317° C. (decomp.).

Similarly, addition of sodium iodide to an aqueous solution of the dimethomethylsulphate precipitates 4-amino - 6 - (2'-amino-6'-methylpyrimidyl-4'-amino)quinaldine 1:1' - dimethiodide which crystallises from water as colourless needles, m. p. 312–313° C. (decomp.) and sodium bromide affords the corresponding 1:1'-dimethobromide which forms colourless needles, from water, m. p. 316° C. (decomp.).

*Example 6*

16.3 parts of dry 4-amino-6 - (2' - amino - 6'-methylpyrimidyl-4'-amino)quinaldine 1-methomethylsulphate and 142 parts of dry nitrobenzene are mixed and heated to 100° C. 5.3 parts of dimethyl sulphate are added and the mixture heated at 120° C. for 12 hours. The product is then isolated as described in Example 5. It melts at 258–260° C.

The starting material is made in the following way:

61.4 parts of 4-amino-6-(2'-amino-6'-methylpyrimidyl-4'-amino)quinaldine are dissolved in 800 parts of β-ethoxy-ethanol. 26.4 parts of dimethyl sulphate are added and the mixture is stirred at room temperature for 24 hours. The product is filtered off, washed with 400 parts of cold methyl alcohol and recrystallised from a mixture of 280 parts of methyl alcohol and 250 parts of water. There is thus obtained 4-amino-6-(2'-amino - 6' - methylpyrimidyl-4' - amino)-quinaldine 1-methomethylsulphate as a pale yellow crystalline powder, m. p. 278–279° C. The corresponding methiodide, obtained by adding sodium iodide to a solution of the above methomethylsulphate in water, crystallises from 58% aqueous alcohol and has m. p. 323–324° C.

I claim:

1. A process for the manufacture of quaternary salts of the pyrimidylaminoquinoline derivatives having the general formula:

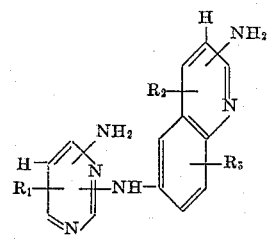

wherein R₁ is a radical from the group consisting of hydrogen, amino, and lower alkyl, and R₂ and R₃ are radicals from the group consisting of hydrogen and lower alkyl which comprises reacting a compound from the group consisting of the free base form and partial salts of compounds having the general formula specified above with a quaternary salt-forming agent.

2. A process as claimed in claim 1 wherein said salt-forming agent is a methyl halide.

3. A process as claimed in claim 1 wherein said salt-forming agent is dimethyl sulphate.

4. A process as claimed in claim 1 wherein said salt-forming agent is a methyl arylsulphonate.

5. A process as claimed in claim 1 wherein the reaction is carried out by heating the reactants together in an inert solvent.

FRANCIS HENRY SWINDEN CURD.

REFERENCES CITED

The following references are of record in the file of this patent:

UNITED STATES PATENTS

| Number | Name | Date |
|---|---|---|
| 2,068,824 | Schonhofer et al. | Jan. 26, 1934 |
| 2,295,563 | D'Alelio | Sept. 15, 1942 |
| 2,465,568 | Basford et al. | Mar. 29, 1949 |

OTHER REFERENCES

Curd et al., J. Chem. Soc., 1613–1619 (1947).

Gabriel et al., Ber. Deut. Chem., 34, 1235 (1901).